United States Patent [19]

Grunau et al.

[11] Patent Number: 5,269,845
[45] Date of Patent: Dec. 14, 1993

[54] CALCIUM ALUMINATE COMPOSITION AND PROCESS FOR MAKING SAME

[75] Inventors: Klaus F. Grunau, Henderson; William W. Hamilton, Blowing Rock, both of N.C.

[73] Assignee: Cer-Con, Inc., Watauga County, N.C.

[21] Appl. No.: 842,883

[22] Filed: Feb. 27, 1992

[51] Int. Cl.$^5$ .............................................. C04B 07/32
[52] U.S. Cl. ..................................... 106/692; 106/696; 106/38.35; 264/309; 427/427
[58] Field of Search ............ 106/692, 695, 696, 38.27, 106/38.35; 264/309; 427/421, 427

[56] References Cited

U.S. PATENT DOCUMENTS

| | | | |
|---|---|---|---|
| 3,600,203 | 8/1971 | Aldera et al. | 106/38.3 |
| 3,995,086 | 11/1976 | Plunguian et al. | 428/310 |
| 4,036,839 | 7/1977 | Plunguian et al. | 264/256 |
| 4,088,808 | 5/1978 | Cornwell et al. | 428/409 |
| 4,310,486 | 1/1982 | Cornwell et al. | 264/309 |
| 4,455,171 | 6/1984 | Spensley et al. | 106/104 |
| 4,495,228 | 1/1985 | Cornwell | 427/385.5 |
| 4,780,141 | 10/1988 | Double et al. | 106/38.3 |
| 4,939,191 | 7/1990 | Kataoka et al. | 524/5 |

FOREIGN PATENT DOCUMENTS 2523572 9/1983 France .................................. 106/696
57-183346 11/1982 Japan .

Primary Examiner—Mark L. Bell
Assistant Examiner—Paul Marcantoni
Attorney, Agent, or Firm—Bell, Seltzer, Park & Gibson

[57] ABSTRACT

A novel cementitious composition based on calcium aluminate and suitable for use in molds is provided. The composition comprises a calcium aluminate powder base, at least one particulate inorganic filler, a latex binding agent chemically compatible with said calcium aluminate powder, at least one dispersing agent, an initiator which initiates the binding of said calcium aluminate powder to said inorganic filler at pH values between 6.5 and 8.0, at least one surface hardness agent comprising an alkyl-aryl sulfonate compound or salt thereof or an aryl sulfonate compound or salt thereof, a polymer salt surface gloss agent, and at least one metal or non-metal oxide wetting agent. A process for producing the composition and a process of applying the composition to form it into a desired shape are also provided.

22 Claims, No Drawings

CALCIUM ALUMINATE COMPOSITION AND PROCESS FOR MAKING SAME

FIELD OF THE INVENTION

This invention relates generally to cementitious compositions, and more specifically relates to calcium aluminate compositions suitable for use the construction of in molds.

BACKGROUND OF THE INVENTION

Cementitious compositions are used to form a wide variety of products, including construction supports, sidewalks, building and decorative tiles, and the like. Generally these compositions comprise a base material, such as Portland cement or calcium aluminate, an inorganic filler, and other additives which influence the physical properties of the composition. Cementitious compositions are attractive to manufacturers and consumers because of their strength, hardness, heat resistance, ease of forming into a desired shape, and relatively low cost.

Recently, interest has developed in using cementitious compositions in prototype molds. Typically, prototype molds are used for the production of a limited number of prototype parts for testing and analysis; as a result, mold-makers generally look for an inexpensive material from which to produce the mold. In addition, prototype mold materials should be hard, easily formed into a potentially complicated and detailed shape, capable of providing a glossy surface, and heat resistant. Commonly used materials are soft metals, such as aluminum, and fiberglass. However, aluminum must be machined into the desired shape, and fiberglass must be hand-laid. In contrast, cementitious materials can be molded easily into the desired shape without the labor-intensity incumbent to aluminum and fiberglass molds, while still satisfying the performance criteria at a low cost.

General purpose cementitious compositions, particularly those based in Portland cement, that have been tried in molds have demonstrated two problems. First, the full curing time of cementitious molds based on Portland cement compositions is typically about 30 days. Prototype molders generally desire a much shorter mold production cycle. In a typical design cycle, a molded item will undergo several design changes before a final design configuration is chosen. Each of these different designs may require the molding and testing of the item in that design. As a result, the turn-around time for mold construction is a major determinant of the duration of the design phase of a project. A material which requires 30 days to cure is thus unsuitable for use in many prototype molds.

Calcium aluminate compositions are generally understood to cure more rapidly than Portland cement compositions, which makes them more viable candidates for use in prototype molds when compared with Portland cement compositions. However, a rapid cure cycle leads to a related concern: a composition with an acceptably brief cure time also typically has an unacceptably short pot life; i.e., it sets up so quickly after mixing that forming it into a desired shape, particularly a complicated shape with considerable detail, is difficult at best. Spensler U.S. Pat. No. 4,455,171 describes a calcium aluminate composition which includes both a setting inhibitor and a reactivator in an attempt to balance the requirements of long pot life and short cure time; however, the combinations disclosed are suitable for extending the shelf life of a composition for several months rather than for a matter of minutes. The prior art is silent on a composition which has a pot life of at least 15 minutes yet cures within 12 to 36 hours.

The second difficulty encountered with cementitious compositions is the tendency of these compositions to develop microcracks in the mold surface which in turn mar the surface of a molded item. This microcracking is exacerbated by exposure of the mold to elevated temperatures. As a result, molds made of Portland cement compositions are not suitable for use in molds which produce parts for which surface appearance is critical. The prior art is silent as to compositions which address or alleviate surface microcracking.

Therefore, there continues to be a need for a cementitious material suitable for use in molds. Such a material would have a pot life which permits forming of a desired shape prior to set-up, a short cure time to permit rapid testing and re-testing of designs, and virtually no surface microcracking.

SUMMARY OF THE INVENTION

With the foregoing in mind, it is an object of the invention to provide a calcium aluminate composition for the molding of polymers which can provide a surface suitably free of microcracks.

It is another object of the invention to provide a calcium aluminate composition which has a pot life that allows the formation of the composition into detailed shapes and, once formed, cures rapidly.

It is a further object of the invention to provide a relatively simple process for producing a calcium aluminate composition suitable for the molding of polymers.

It is an additional object of the invention to provide a method for forming a calcium aluminate composition suitable for the molding of polymers into a mold.

It is anther object of the invention to provide a mold made of a calcium aluminate composition suitable for the molding of polymers.

These and other objects of the invention are provided by the calcium aluminate composition of the present invention. It has been discovered that a composition comprising a calcium aluminate powder base, at least one particulate inorganic filler, a latex binding agent chemically compatible with said calcium aluminate powder, at least one dispersing agent, an initiator which initiates the binding of said calcium aluminate powder to said inorganic filler at pH values between 6.5 and 8.0, at least one surface hardness agent comprising an alkyl-aryl sulfonate compound or salt hereof or an aryl sulfonate compound or salt thereof, a polymer salt surface gloss agent, and at least one metal or non-metal oxide wetting agent produces a suitable composition for polymer molding. This composition has a pot life of between about 15 minutes and 45 minutes, which allows a mold to be formed, and a cure time of between about 12 and 36 hours. The composition also produces a surface which is virtually free of microcracks which would mar the visual surface of a molded article.

The calcium aluminate composition can also include silicone dioxide as a filler, which produces a composition capable of withstanding 800° F. without suffering discernible microcracks in the surface. This composition cures to a usable state within 24 hours of application to a male model.

The present invention also relates to a process for producing such a calcium aluminate composition comprising soaking at least one metal or non-metal wetting agent in water for at least 4 hours, thereby forming a thick gel, mixing the gel with a latex binding agent chemically compatible with the calcium aluminate powder, at least one dispersing agent, an initiator which initiates the binding of the calcium aluminate powder to the inorganic filler at pH values between 6.5 and 8.0, at least one alkyl-aryl sulfonate compound or salt or aryl sulfonate compound or salt surface hardness agent, and a polymer salt surface gloss agent to form a slurry, and combining the slurry with a calcium aluminate powder base and at least one particulate inorganic filler, thereby forming a cementitious composition.

DETAILED DESCRIPTION OF THE INVENTION

The present invention will now be described more fully hereinafter. This invention may be embodied in many forms and should not be construed as limited to the embodiment set forth herein; instead, this embodiment is provided so that this disclosure will be thorough and complete, and will fully convey the scope of the invention to those skilled in the art.

As summarized above, the composition of the present invention has a pot life of between about 15 and 45 minutes, is rapidly cured (within 12-36 hours), and provides a surface suitable for precision high gloss molding of polymers. The composition comprises a calcium aluminate powder base, at least one particulate inorganic filler, a latex binding agent chemically compatible with the calcium aluminate powder, at least one dispersing agent, an initiator which initiates the binding of said calcium aluminate powder to the inorganic filler at pH values between 6.5 and 8.0, at least one alkyl-aryl sulfonate compound or salt or aryl sulfonate compound or salt surface hardness agent, a polymer salt surface gloss agent, and at least one metal or non-metal oxide wetting agent.

Preferably, the composition comprises between about 30 and 40 percent by weight of a calcium aluminate base and between about 30 and 40 percent by weight of inorganic filler. These components form the solid matrix of the composition that provides most of the physical properties of the material. The remaining components of the composition are chosen to advantageously disperse and bind these solid particles within the composition to maximize the physical performance of the overall composition. Preferably, the composition includes between about 25 and 35 percent by weight of polymer binding agent, between about 0.0005 and 0.0050 percent by weight of dispersing agent, between about 0.0005 and 0.0050 percent by weight of initiator, between about 0.05 and 0.50 percent by weight of hardness agent, between about 0.05 and 0.50 percent by weight of gloss agent, and 1.0 and 2.0 percent by weight of wetting agent. More preferably, the composition includes between about 0.001 and 0.002 percent by weight of dispersing agent, between about 0.001 and 0.002 percent by weight of initiator, between about 0.25 and 0.40 percent by weight of hardness agent, between about 0.1 and 0.2 percent by weight of gloss agent, and 1.3 and 1.5 percent by weight of wetting agent. Additionally, the compound may include between about 0.06 and 0.08 percent by weight of air entraining agent. Further, the composition may contain between about 0.25 and 0.30 percent by weight of a gelling agent and between about 0.25 and 0.30 percent by weight of a foaming agent.

The calcium aluminate base compound can be virtually any calcium aluminate hydraulic cement product. As used herein, the term "hydraulic cement" refers to a composition of inorganic particles which when mixed with water react to form a hard, rock-like mass, and the term "calcium aluminate" refers to a hydraulic cement composition of CaO (calcium oxide) and $Al_2O_3$ (alumina). A product containing approximately 65 to 75 percent alumina and 35 to 25 percent calcium oxide is preferred, as is a product with a specific surface area of between 3,900 and 4,500 $cm^2/g$. A particularly preferred calcium aluminate composition is Secar 71, available from LaFarge Calcium Aluminates, Chesapeake, Virginia.

Suitable inorganic fillers include any fillers known to those skilled in the art compatible with the chosen calcium aluminate base. The filler particles can be of any suitable shape, including granules, fibers, and powders. Preferred fillers include calcium silicate, aluminum oxide, silicon carbide, amorphous silica, and combinations thereof. Particularly preferred calcium metasilicates are Vansil W-10, available from R. T. Vanderbilt Company, Inc., Norwalk, Connecticut, and NYAD-G, available from Nyco Minerals, Inc., Willsboro, New York. A particularly preferred silicon carbide is Electrocarb, available from Electro Abrasives Corporation, Buffalo, New York. A particularly preferred amorphous silica is condensed silica fume, available from SKW Canada Inc., Becancour, Quebec, Canada. A particularly preferred aluminum dioxide is FRF-10, available from Alcan Chemicals, Cleveland, Ohio. A more preferred filler combination is approximately equal parts of silicon carbide, aluminum oxide, and calcium metasilicate.

The filler generally affects the physical properties of the composition and should be chosen accordingly. For example, a calcium metasilicate or aluminum oxide filler can enhance the mechanical elasticity of the composition, while a mixture of calcium metasilicate and silicon carbide can provide increased mechanical strength, surface hardness and surface toughness at elevated temperatures The latex binding agent is included to promote adhesion of the calcium aluminate and the inorganic filler particles. The binding agent can be any polymer binding agent that is chemically compatible with the calcium aluminate powder. Generally, the binding agent comprises polymer particulate dissolved in an appropriate solvent. Exemplary binding agents include polyvinyl acetate, polyvinyl alcohol, polyacrylamide, and polyethylene oxide. A preferred polymer binding agent is an emulsion of particulate polymer in a solvent having a solids content of between 45 and 55 percent. A most preferred polymer binding agent is Liquid Bond, a proprietary formulation available from R-Co Products, Inc., Lakewood, New York.

Suitable dispersing agents are compounds capable of causing the solid particles in the composition to disperse into and remain in a substantially homogeneous matrix. It has been observed that, during mixing, the calcium aluminate and inorganic filler particles tend to form small spheres which lack any binding agent; the presence of these spheres causes the physical properties of the composition to suffer. Accordingly, the dispersing agent selected should prevent the formation of these spheres. A preferred dispersing agent is Colloid 679, available from Rhne-Poulenc, Newark, N.J., which is a proprietary formula containing petroleum hydrocarbons.

The initiator can be any compound which will initiate the binding of the calcium aluminate particles and the inorganic filler to the latex binding agent while present in a solution having a pH value of between 6.5 and 8.0. The specified pH range is that produced by calcium aluminate-based compositions, which tend to be less alkaline than other hydraulic cements. Exemplary initiators are lithium hydroxide and lithium carbonate. The presently preferred initiator is monohydrate lithium hydroxide, available from FMC Corporation, Gastonia, North Carolina.

Suitable hardness agents are those which impart surface hardness to the cured composition. Exemplary hardness agents include alkyl-aryl sulfonate compounds and aryl sulfonate compounds and alkali metal salts thereof. Preferred hardness agents include naphthalene sulfonate condensate and calcium lignosulfonate, with a mixture of naphthalene sulfonate condensate and calcium lignosulfonate being more preferred. Naphthalene sulfonate condensate is particularly preferred because it inhibits the immediate setting of the composition and thus increases the pot life of the composition. Calcium lignosulfonate is particularly preferred because it inhibits the formation of microcracks in the surface of a formed article. Most preferred is a mixture of Darvan 9, a sulfonated naphthalene condensate composition, and Darvan 404, a calcium lignosulfonate composition, both of which are available from R. T. Vanderbilt Company, Inc.

Suitable gloss agents include any polymer salt which enhances the surface gloss of the cured composition. Exemplary gloss agents include sodium polyacrylate, melamine sulfonate, and naphthalene sulfonate. The preferred gloss agent is sodium polyacrylate; more preferred is Darvan 811-D, a sodium polyacrylate composition available from the R. T. Vanderbilt Company, Inc.

The metal or non-metal oxide wetting agent can be any metal or non-metal oxide with pozzolanic properties. The oxide can be included singly or in combination with other oxides. Preferred wetting agents are formed silica, colloidal zirconia, and silicon dioxide. More preferred is a combination of fumed silica, colloidal zirconia, and silicon dioxide. Most preferred is a combination of Fumed Silica FSM5, a fumed silica composition available from Cabot Corporation, Tuscola, Illinois, Nyacol 830, a silicon dioxide suspension, available from Nyacol Products Inc., Ashland, Massachusetts, and Nyacol 2R 150-20, a colloidal zirconia composition also available from Nyacol Products Inc.

Optionally, the composition may include a foaming agent which reduces the density of the material and therefore reduces its cost. Suitable foaming agents include mineral acids and other pH-induced foaming agents, such as tri-n-butyl phosphate. A preferred foaming agent is Mearcel 3532, available from The Mearl Corporation, Roselle Park, New Jersey. If a foaming agent is used, it is preferred that the composition also include a gelling agent to equally disperse and minimize the size of the voids created by the foaming agent. A preferred gelling agent is triethanolamine; a more preferred triethanolamine is AV-101, available from Avanti International, Webster, Texas.

Optional to the composition is an air entraining agent that provides venting pathways in the composition after curing. The capacity for air travel through an article formed from the composition is preferable in certain applications, e.g., as a mold used to mold high temperature plastics with low hydrolytic stability. The air pathways present in the mold provide an escape route for steam produced by the molding process that would otherwise damage the molded item. Exemplary air entraining agents include aryl-fatty acid salts and sulfonated aryl-fatty acid salts, and combinations of these compounds and glycerine. A preferred air entraining agent is a combination of sodium dodecyl benzene sulfonate and glycerine; a more preferred is Addiment LPI, a composition containing sodium dodecyl benzene sulfonate and glycerine, which is available from Addiment, Inc., Doraville, Georgia.

Also optional to the composition are reinforcing fillers used to strengthen the composition. Suitable reinforcing agents include any that are chemically compatible with the composition and that do not adversely affect the surface hardness or gloss of the composition. Exemplary reinforcing fillers include fiberglass, aluminum, and Kevlar ® fibers.

The process for making the composition comprises first immersing all wetting agents to be included in the composition in water for 4-12 hours until a thick gel forms. The polymer binding agent, dispersing agent, hardening agents, gloss agents, initiator, and any other optional components are then mixed into the wetting agent gel and blended for 1-2 hours into a slurry. Small portions of the slurry are added to an appropriate amount of a mixture of calcium aluminate and inorganic filler and are mixed through the application of high shear force for 20-40 seconds in a high shear mixer. This mixture is combined with any desired reinforcing agent, such as a glass or metal fiber, then transferred to spraying equipment for forming into a desired shape. The pot life of this mixture is between about 15 and 40 minutes, which is generally sufficient time to create whatever shape is desired.

The spraying equipment used to apply the composition to a mold can be any known to those in the art to be suitable for application of cementitious compositions. An airless sprayer is preferred to prevent the introduction of air pockets into the composition which may become material voids after curing.

In a preferred embodiment, the composition is used in a process for forming a mold. In this embodiment, the composition is sprayed onto a male model of an item. The composition will take the form of the male model upon curing and can then be used to form items in the shape of the male model in a desired material. Preferably, the model is coated prior to spraying with a mold release compound compatible with the composition. The mold release agent should be selected for its ability to permit removal of the model from the model without damaging the mold. If the model has substantial vertical surfaces, the mold release agent must also permit the adhesion of composition to the model during spraying and initial curing to form the mold, but still release the mold upon full cure. A preferred mold release agent is Crete-Lease 20-VOC, a proprietary formulation available from Cresset Chemical Company, Weston, Ohio. The model is sprayed until a thin shell of the composition, (e.g., between ¾ and 1 ¼ inches thick) forms. This shell is cured for between 4 and 8 hours. If the mold is to include any means for heating or cooling, these are placed into the appropriate position at this time. Additional material is then sprayed on to the thin shell to fill out the remaining volume of the mold and any detail required for subsequent operation.

The curing process can occur at room temperature within 12 to 36 hours. As is known in the art, the curing time can be decreased by heating the molded article to between about 200 and 400° F. With some embodiments, elevated temperature curing will also improve the binding of the polymer binding agent and increase the surface hardness of the composition. It is preferred to vacuum the article after it has initially set to remove water. This is particularly preferred when the article is to be heated for accelerated setting; removal of water helps to prevent hydrolysis of the composition due to the heat.

The present invention and its advantages over the prior art will be more fully understood and appreciated from the illustrative examples that follow. It is to be understood that the examples are for the purpose of illustration and are not intended to be limiting upon the scope of the invention. A person skilled in the applicable arts will appreciate from this example that the invention can be embodied in many different forms other than those specifically disclosed.

EXAMPLE 1

The composition can be mixed by first combining the calcium aluminate base and fillers, blending the remaining ingredients in a separate drum into a liquid slurry, then combining these two mixtures into a single composition. The ingredients of the liquid slurry, known as the "premix", are combined in the amounts shown in Table 1.

TABLE 1

| Manufacturer | Product | Amount (pbw) |
|---|---|---|
| R Company | Liquid Bond | 100 |
| R. T. Vanderbilt Co. | Darvan 9 | 0.5 |
| R. T. Vanderbilt Co. | Darvan 811 D | 0.5 |
| R. T. Vanderbilt Co. | Darvan 404 | 0.5 |
| Rhone-Poulenc | Colloid 679 | 0.05 |
| Mearl Corporation | Mearcel 3532 | 1 |
| Avanti | AV 101 | 0.5 |
| Cabot, Cab-o-sil Div. | Fumed Silica FSM5 | 2 |
| FMC | Lithium Hydroxide | 0.05 |
| Addiment, Inc. | Addiment LPI | 0.25 |
| Nyacol Prod. Inc. | Nyacol 830 | 1 |
| Nyacol Prod. Inc. | Nyacol 2R 150-20 | 2 |

EXAMPLE 2

Using the process described above, 40 parts of premix slurry of Example 1 was added to the following solid components:

TABLE 2

| Manufacturer | Product | Amount (pbw) |
|---|---|---|
| LaFarge | Secar 71 CA | 50 |
| R. T. Vanderbilt Co. | Vansil W-10 | 17 |
| Electro Abrasives | Electrocarb | 33 |

The resulting product exhibits acceptable surface hardness and gloss. Molds from this material can be exposed to at least 800° F. without thermal decomposition of the mold or discernible microcrack formation.

EXAMPLE 3

This composition combined 45 parts of the premix slurry of Example 1 with the following ingredients:

TABLE 3

| Manufacturer | Product | Amount (pbw) |
|---|---|---|
| LaFarge | Secar 71 CA | 50 |
| R. T. Vanderbilt Co. | Vansil W-10 | 30 |
| Electro Abrasives | Electrocarb | 20 |

The final composition exhibits acceptable surface hardness and gloss and resists microcracking and thermal degradation up to 650° F.

EXAMPLE 4

This composition was prepared by combining 40 parts of premix slurry as described in Example 1 with the following solid components:

TABLE 4

| Manufacturer | Product | Amount (pbw) |
|---|---|---|
| LaFarge | Secar 71 CA | 50 |
| Electro Abrasives | Electrocarb | 50 |

The resulting composition exhibits acceptable surface hardness and gloss and does not thermally decompose nor exhibit microcracks at elevated temperatures.

EXAMPLE 5

A composition was made by combining 55 parts of the premix slurry described in Example 1 with the following components:

TABLE 5

| Manufacuturer | Product | Amount (pbw) |
|---|---|---|
| LaFarge | Secar 71 CA | 50 |
| R. T. Vanderbilt Co. | Vansil W-10 | 35 |
| BNZ | Calcium Silicate | 15 |

This composition exhibits good surface hardness and gloss resists thermal degradation and microcracking up to 450° F.

EXAMPLE 6

A composition was made by mixing 35 parts of the premix slurry described in Example 1 to the following solid components:

TABLE 6

| Manufacturer | Product | Amount (pbw) |
|---|---|---|
| LaFarge | Secar 71 CA | 50 |
| Electro Abrasives | Electrocarb | 50 |

The resulting composition exhibits acceptable surface hardness and gloss and resists thermal degradation and microcracking up to 400° F.

EXAMPLE 7

A composition was made containing 40 parts of premix slurry as described in Example 1 and the following components:

TABLE 7

| Manufacturer | Product | Amount (pbw) |
|---|---|---|
| LaFarge | Secar 71 CA | 50 |
| R. T. Vanderbilt Co. | Vansil W-10 | 33 |

TABLE 7-continued

| Manufacturer | Product | Amount (pbw) |
|---|---|---|
| Electro Abrasives | Electrocarb | 17 |

This composition exhibits acceptable surface hardness and gloss and resists microcracking and thermal degradation up to 800° F.

The foregoing examples are illustrative of the present invention, and are not to be construed as limiting thereof. The invention is defined by the following claims, with equivalents of the claims to be included therein.

That which is claimed is:

1. A cementitious composition particularly useful in the construction of molds, said composition comprising:
   (a) 30–40 percent by weight of a calcium aluminate powder base;
   (b) 30–40 percent by weight of at least one particulate inorganic filler;
   (c) 25–35 percent by weight of a latex binding agent chemically compatible with said calcium aluminate powder;
   (d) 0.0005–0.005 percent by weight of at least one dispersing agent;
   (e) 0.0005–0.005 percent by weight of an initiator which initiates the binding of said calcium aluminate powder to said inorganic filler at pH values between 6.5 and 8.0;
   (f) 0.05–0.5 percent by weight of at least one surface hardness agent comprising an alkyl-aryl sulfonate compound or salt thereof or an aryl sulfonate compound or salt thereof;
   (g) 0.05–0.5 percent by weight of a polymer salt surface gloss agent; and
   (h) 1–2 percent by weight of at least one metal or non-metal oxide wetting agent.

2. A composition according to claim 1 wherein said particulate inorganic filler is selected from the group consisting of amorphous silica, silicon carbide, calcium metasilicate, and aluminum oxide.

3. A composition according to claim 1 wherein said latex binding agent comprises an emulsion of particulate polymer having a solids content of between about 45 and 55 percent.

4. A composition according to claim 1 wherein said initiator comprises lithium hydroxide.

5. A composition according to claim 1 wherein said alkyl-aryl sulfonate compound or salt thereof or aryl sulfonate compound or salt thereof surface hardness agent comprises a mixture of sulfonated naphthalene condensate and calcium lignosulfonate.

6. A composition according to claim 1 wherein said polymer salt surface gloss agent comprises sodium polyacrylate.

7. A composition according to claim 1 wherein said metal or non-metal oxide wetting agent is selected from the group consisting of fumed silica, and colloidal zirconia.

8. A composition according to claim 7 wherein said metal or non-metal oxide is a combination of fumed silica, and colloidal zirconia.

9. A composition according to claim 1 which further comprises an air entraining agent.

10. A composition according to claim 9 wherein said air entraining agent comprises a sodium aryl-fatty acid salt.

11. A composition according to claim 1 which further comprises a gelling agent.

12. A composition according to claim 11 wherein said gelling agent comprises triethanolamine.

13. A composition according to claim 1 which further comprises a foaming agent.

14. A composition according to claim 13 wherein said foaming agent comprises tri-n-butylphosphate.

15. A composition according to claim 2 wherein said inorganic filler comprises a mixture of aluminum oxide, calcium metasilicate, and silicon carbide.

16. A process for producing a cementitious composition comprising the steps of:
   (a) soaking 1–2 percent by weight of at least one metal or non-metal oxide wetting agent in water, thereby forming a thick gel;
   (b) mixing the gel with 25–30 percent by weight of a latex binding agent chemically compatible with calcium aluminate powder, 0.0005–0.005 percent by weight of at least one dispersing agent, 0.0005–0.005 percent of an initiator which initiates the binding of said calcium aluminate powder to said inorganic filler at pH values between 6.5 and 8.0, 0.05–0.5 percent by weight of at least one surface hardness agent comprising an alkyl-aryl sulfonate compound or salt thereof or an aryl sulfonate compound or salt thereof, and 0.05–0.5 percent by weight of a polymer salt surface gloss agent to form a slurry; and
   (c) combining the slurry with 30–40 percent by weight of a calcium aluminate powder base and 30–40 percent by weight of at least one particulate inorganic filler, thereby forming a cementitious composition.

17. A process according to claim 16, wherein the metal or non-metal oxide wetting agent is at least one selected from the group consisting of fumed silica, and colloidal zirconia.

18. A process according to claim 16, wherein the metal or non-metal oxide wetting agent is a mixture of fumed silica, and colloidal zirconia.

19. A process of making an article from the composition of claim 1 comprising spraying the composition while avoiding the entraining of air into the composition onto an object configured to form the composition into a desired shape.

20. A process according to claim 19 wherein the object for forming the composition comprises a male model, and wherein the desired shape is a female mold conforming to the male model.

21. An article formed by the process of claim 19.

22. An article according to claim 21, wherein the article formed is a female mold.

* * * * *

UNITED STATES PATENT AND TRADEMARK OFFICE
CERTIFICATE OF CORRECTION

PATENT NO. : 5,269,845

DATED : December 14, 1993

INVENTOR(S) : Grunau et al.   (Our File 4173-6)

It is certified that error appears in the above-identified patent and that said Letters Patent is hereby corrected as shown below:

Column 5, Line 1, after "from" delete "Rhne" and insert --Rhône--.

Column 10, Line 29, after "percent" insert --by weight--.

Signed and Sealed this

Second Day of August, 1994

Attest:

BRUCE LEHMAN

Attesting Officer      Commissioner of Patents and Trademarks